March 21, 1967 R. G. BUDDEN 3,310,047
GAS BURNING INFRA-RED HEATING DEVICE
Filed March 22, 1965 3 Sheets-Sheet 1
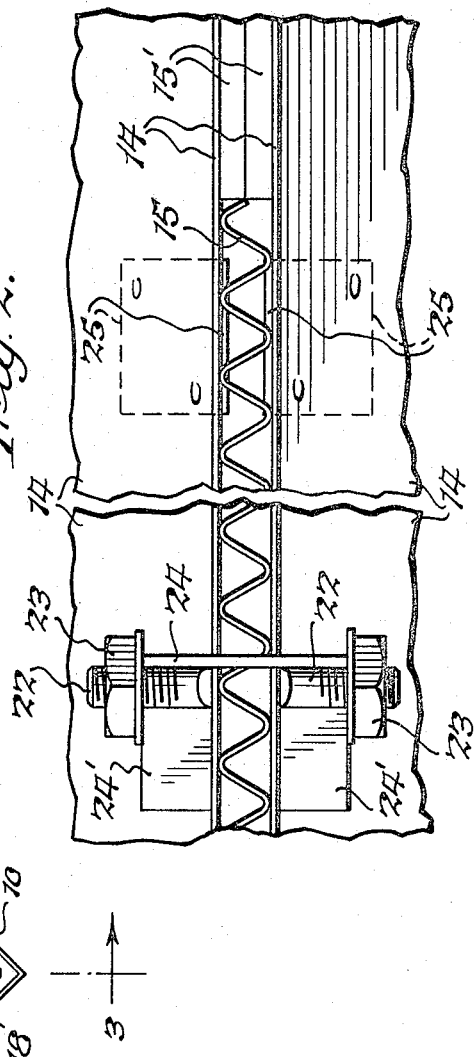
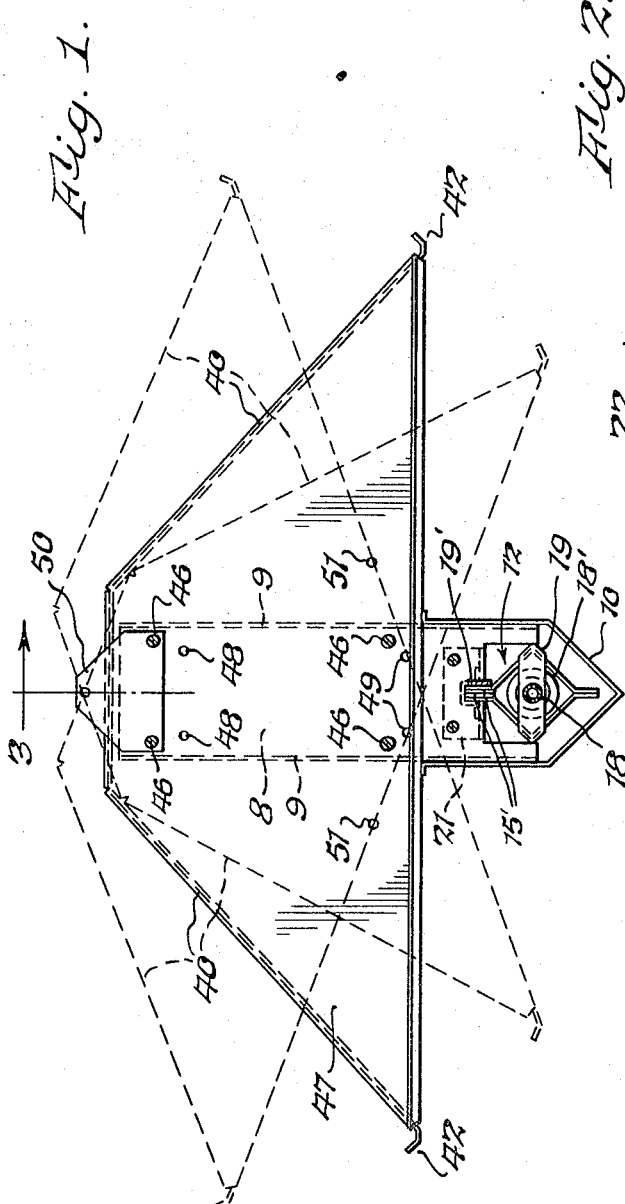
INVENTOR.
Robert G. Budden,
BY
ATTORNEYS

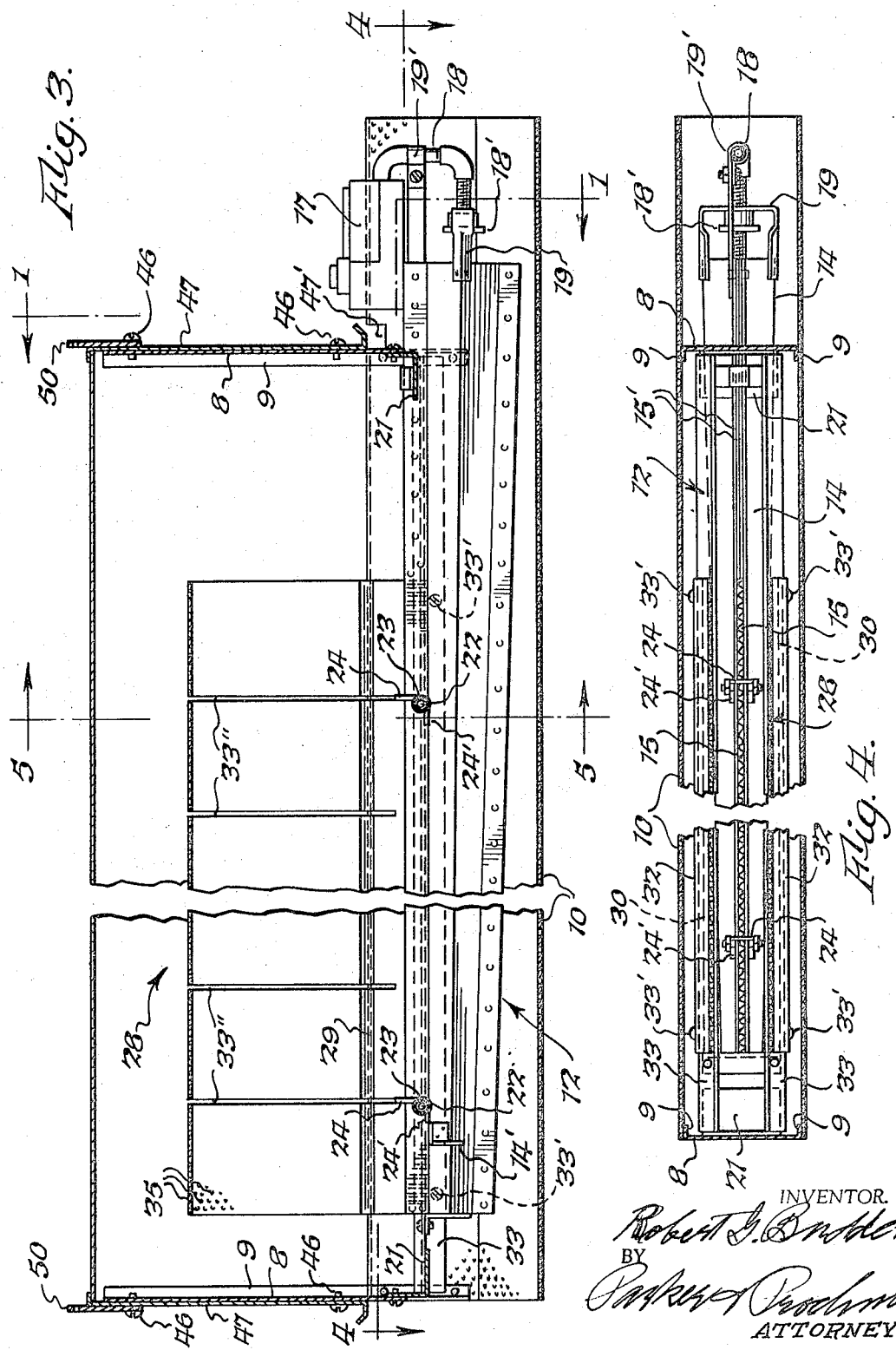

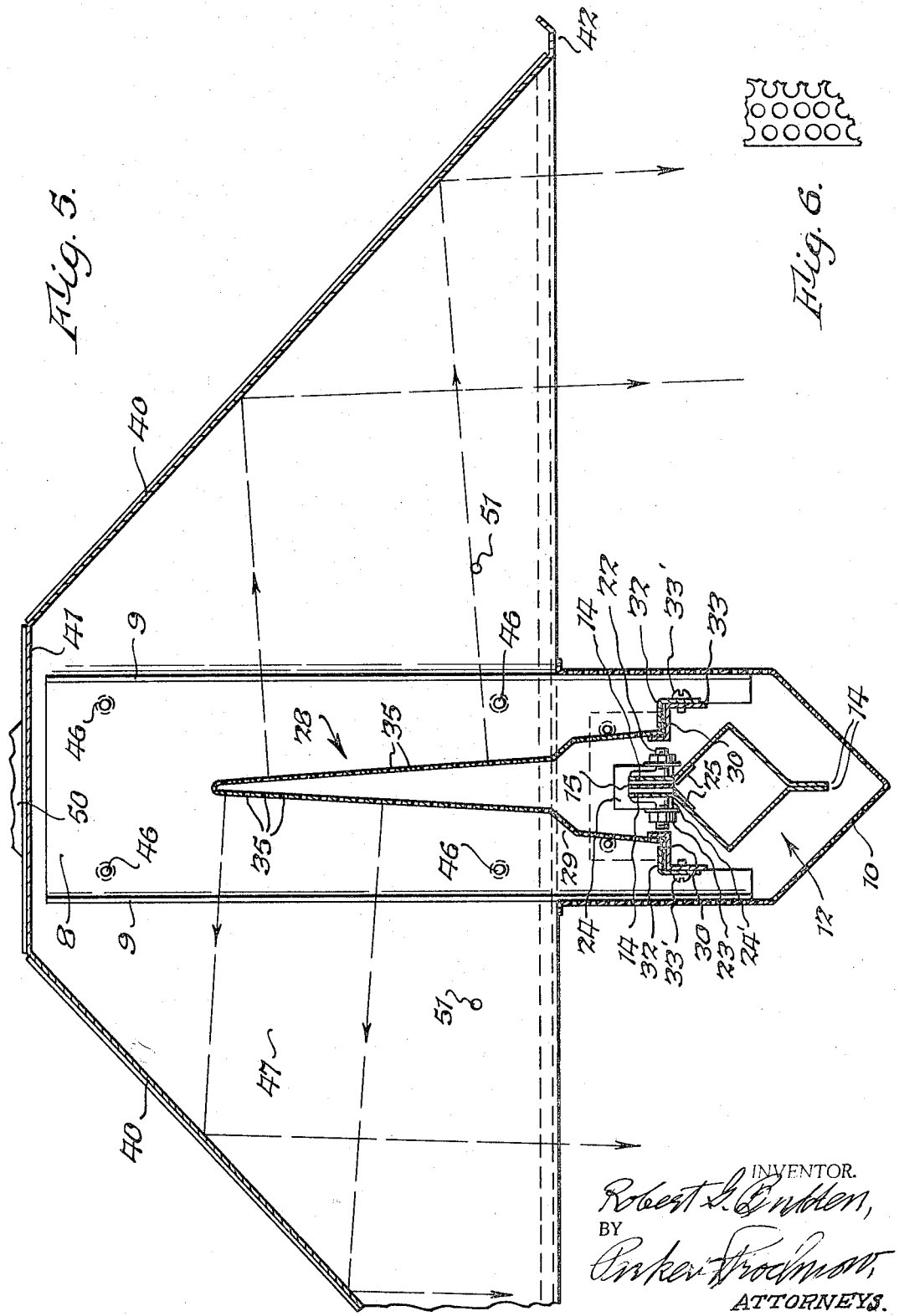

United States Patent Office 3,310,047
Patented Mar. 21, 1967

3,310,047
GAS BURNING INFRA-RED HEATING DEVICE
Robert G. Budden, Clarence, N.Y., assignor to Roberts-Gordon Appliance Corporation, Buffalo, N.Y.
Filed Mar. 22, 1965, Ser. No. 441,696
2 Claims. (Cl. 126—92)

This invention relates to improvements in infra-red heating devices of the type which are supported overhead and which reflect heat rays downwardly.

One of the objects of this invention is to provide an infra-red heating device having a generator which must remain in a vertical position and from which the heat rays are deflected downwardly by a reflector, and in which the reflector is so mounted that it can be arranged at an angle to reflect heat rays to one or the other side of the heating device.

Another object is to provide a radiant emitter made of metal which floats freely in its mounting bracket adjacent to the flame to permit expansion and contraction while preventing distortion of the same in relation to the flame pattern.

Another object is to provide the infra-red generator with a plurality of slots which divide the generator into a plurality of spaced apart panels to avoid warping of the generator as a whole and thereby keeping the same always in correct relation to the flame.

Another object is to provide an infra-red generator which conforms to the natural pattern of a flame and its hot gases so as to heat this generator at maximum efficiency.

It is also an object of this invention to provide a design of the heating device which lends itself readily to production in various sizes.

A further object is to provide the heating device with a reflector above the heat emitter which functions not only to direct infra-red energy downwardly from the heater, but also to provide a hood which collects the hot convectional currents and flue products which radiate infra-red energy and also maintain high temperatures of the heat emitter surface.

A further object of this invention is to arrange the infra-red surfaces to emit useful infra-red energy without requiring insulation in any part of the infra-red heating device to prevent heat losses.

In the accompanying drawings:

FIG. 1 is an end view of an infra-red heating device embodying this invention with the gas-controlled means removed, the view being taken on line 1–1, FIG. 3.

FIG. 2 is a top plan view on an enlarged scale of a portion of the burner.

FIG. 3 is a longitudinal, sectional elevation thereof on line 3–3, FIG. 1.

FIG. 4 is a sectional plan view thereof on line 4–4, FIG. 3.

FIG. 5 is a transverse, sectional elevation thereof on line 5–5, FIG. 3.

FIG. 6 is a detail view showing a part of the surface of the radiant heat emitter or generator.

The gas burner which supplies heat to the infra-red heating device is supported on a frame including end panels 8 having flanges 9 and connected at their lower portions by means of a channel or trough-shaped part 10 and which is made of perforated metal and constitutes a burner shield.

12 represents the burner which is preferably made of two channel-shaped strips of metal with flanges 14 which are secured together to form a passage or duct for the fuel. When the heating device is of elongated form the fuel duct preferably tapers from the gas-receiving end of the burner. The lower flanges 14 are secured together in a gas-tight manner, such as brazing, and the upper flanges are spaced apart to form discharge orifices for the combustible gases. The orifices may be formed in any suitable manner, and in the construction shown for this purpose a corrugated metal strip 15 is arranged between the two upper flanges 14, thus providing orifices through which the gas may pass. The portion back toward the input end is fitted with filler strips 15' and made gas-tight.

A primary mixture of gas and air is introduced into the larger end of the fuel duct in any suitable manner. As shown, a valve chamber 17 is provided which receives gas and supplies the same to a tube 18 discharging into the fuel passage. The jet of gas thus passing into the fuel duct draws in a regulated quantity of air, thus forming a primary mixture which passes through the discharge orifices, where it is supplied with secondary air passing through the perforations in the burner shield 10. The tube 18 is supported on the fuel duct 14 by brackets 19 and 19'. The air valve 18' for controlling the quantity of air entering the duct 14 may be of any usual or desired construction, and also a bracket 14' for mounting of a pilot burner is shown, the pilot burner not being shown.

The fuel duct 14 may be supported from the front and rear panels 8 of the housing in any suitable manner, for example, by means of brackets 21. The corrugated metal strip 15 rests between the flanges 14 of the burner part of the fuel duct upon several stops 25 being shown in FIG. 2. These stops are typical of several pairs along the burner length and prevent the corrugated strip 15 from falling into the duct 14. The strip 15 is also held down in place flush with the upper surface of the flanges 14 by U-shaped brackets 24 having the lower part of their legs bent horizontally, as at 24'. Studs 22 welded to the opposite flanges 14 having nuts 23 threaded thereon hold the assembly in locked relation, maintaining the strip flush with the flanges 14 and also maintaining proper burner opening width.

The infra-red rays are produced by heating a radiant emitter or generator 28 by means of the flame from the fuel duct 14. This emitter or generator is formed of sheet metal of substantially inverted V-shape and having the lower portion thereof flared outwardly at 29 for the purpose of following the contour of the flame and hot gasses discharged from the burner. This emitter is provided at the lower edge thereof with outwardly extending flanges 30 secured between a pair of angles 32 and 33. The angles 33 are supported on the end panels 8 of the burner housing by the brackets 21 and the angles 32 clamp the flanges 30 to the angles 33 by screw fasteners 33'. The radiant emitter 28 is provided with vertical slots 33'' at intervals which form the emitter into a plurality of upright sections. By means of those slots which divide the emitter into a plurality of sections connected only at their lower ends, the deformation or warping of the emitter, due to heat applied thereto by the burner, is reduced to a minimum. This is an important feature to produce an efficient and improved heating device, in that the various sections of the emitter remain in substantially constant relationship to the flame so that maximum heating of the emitter results. The emitter being of relatively light weight metal, becomes heated quickly to a temperature at which infra-red rays are generated and projected outwardly from the same. The emitter is also made of perforated metal and the perforations 35 therein serve not only to discharge products of combustion from the interior of the emitter, but also to reflect infra-red rays from the inner surface of one side of the emitter through the perforations of the other side, so as to produce the maximum quantity of infra-red rays discharged from the emitter.

By making the burner tube 14 tapering so that it is of smallest diameter at the portion thereof remote from the gas inlet, a uniform discharge of primary mixture will take place throughout the length of the burner, thus resulting in a substantially uniform heating of the emitter from end to end thereof.

The infra-red rays discharged from the emitter pass to a reflector which in the construction shown includes a pair of outwardly flaring portions 40 connected at their upper edges by a transverse member 41. In FIG. 5 I have shown the infra-red rays in broken lines to illustrate how they are directed from the emitter to the reflector in a direction more or less perpendicular to the surfaces of the two sides of the emitter, and upon striking the reflector are projected downwardly. The reflector is preferably made of a bright surface metal, such as stainless steel or aluminum and the outer edges of the two sides 40 are flared outwardly and upwardly at 42 to reinforce the reflector which is preferably also made of a light gage metal.

As shown in FIG. 5, the heat rays are reflected mainly downwardly, but the reflector may be adjusted so as to reflect the rays to either side of the main housing or body of the heating device. It must of course be borne in mind that the burner and emitter must remain in the position shown without tilting, and consequently the reflector is arranged to be tilted relatively to the burner and emitter. In the construction shown for this purpose I have provided the end plates 8 of the heater with apertures and bolts 46 which are formed to extend through the apertures in the end plates. The reflector is also provided with end plates 47 and suitable perforations through which these bolts 46 extend, and these bolts extend through upwardly extending brackets or straps 50 by means of which the heating device may be suspended from an overhead support. When the reflector is positioned in one of the two inclined positions shown in broken lines in FIG. 1, then one of another set of holes 48 is used by the bolts 46, and similarly, if the reflector is tilted in the opposite direction, the other set of holes 48 is used to mount the reflector on the frame of the heating device. By means of this construction the burner and emitter remain in fixed positions while the reflector is turned to the desired angle. Cutout notches 47' in the vertical sides of the channel 10 allow tilting of the reflector by permitting the end plates 47 to move down below their top edge.

The end plate 8 and the reflector are also provided with holes 49 and 51 which may be placed in registration for insertion of pins or bolts 46 to hold the reflector in either inclined position.

By means of the construction shown the hot gases discharge from the burner, after heating the radiant emitter or generator 28 are collected in the upper portion of the reflector. These hot gases radiate infra-red heat and also maintain high temperatures of the emitter.

The heating device described is such that it can be readily constructed in various lengths, merely by increasing the length of the burner, the radiant emitter and the reflector. The burner is also formed to operate at high efficiency by forming the emitter with perforations or openings 35 through which rays from one side of the emitter may pass to the reflector on the other side thereof. By dividing the emitter with the slots 33" so that various parts lengthwise of the same are separated from each other and will not produce any material deflection or warping during the use of the burner, efficient operation of the emitter is ensured.

It will be understood that various changes in the details, materials and arrangements of parts which have been herein described and illustrated in order to explain the nature of the invention may be made by those skilled in the art within the principle and scope of the invention as expressed in the appended claims.

I claim:

1. An infra-red heating device including a gas burner extending lengthwise of said device,
    a radiant heat emitter including a pair of panels extending upwardly and meeting at their upper ends to form an inverted V-shaped structure,
    said panels being of perforated metal of high heat emitting surfaces and having their lower parts flared outwardly to form between them a passage for flame and hot products of combustion and in which said burner is arranged,
    and a reflector having inclined, downwardly extending reflecting surfaces arranged at opposite sides of said heat emitter and which reflects radiant heat from said emitter downwardly,
    said reflector forming a hood about said radiant heat emitter and confining the products of combustion about said emitter and venting the same only from the lower edges thereof.

2. A heating device according to claim 1 in which said perforated panels of said pair of said emitters are arranged in close proximity to each other whereby some of the infra-red heat emitted from the adjacent faces of said panels passes from one panel through perforations of the other panel.

References Cited by the Examiner

UNITED STATES PATENTS

| | | | |
|---|---|---|---|
| 2,051,213 | 8/1936 | Hamilton | 126—92 |
| 2,130,086 | 9/1938 | Hart | 126—85 |
| 2,439,038 | 4/1948 | Cartter | 126—92 |
| 2,591,235 | 4/1952 | Cartter | 126—91 |
| 3,265,057 | 8/1966 | Horne | 126—92 |

FOREIGN PATENTS

| | | |
|---|---|---|
| 10,150 | 1910 | Great Britain. |
| 609,406 | 9/1948 | Great Britain. |
| 610,575 | 10/1948 | Great Britain. |

JAMES W. WESTHAVER, *Primary Examiner.*